Figure 2:
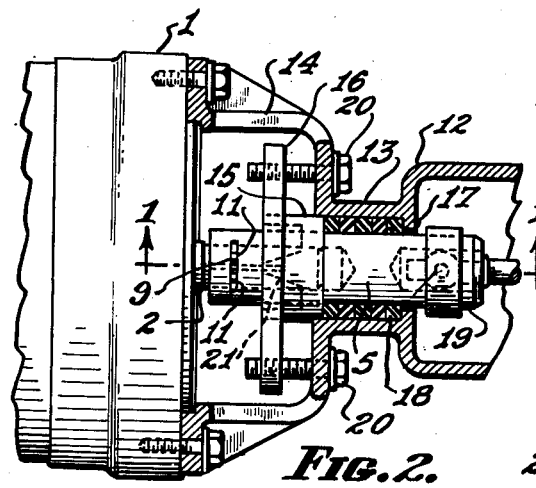

June 3, 1952 — F. C. BYRAM — 2,598,758
CLOSE COUPLING FOR MOTORIZED PUMPS
Filed Dec. 28, 1945

INVENTOR.
FREDERICK CAMERON BYRAM.
BY Allen & Allen
ATTORNEYS

Patented June 3, 1952

2,598,758

UNITED STATES PATENT OFFICE 2,598,758

CLOSE COUPLING FOR MOTORIZED PUMPS

Frederick Cameron Byram, Springfield, Ohio, assignor to Robbins & Myers, Inc., Springfield, Ohio, a corporation of Ohio Application December 28, 1945, Serial No. 637,535

7 Claims. (Cl. 287—119)

My invention relates to constructions whereby the operating shafts for pumps are coupled to motor drives therefor and suitably packed with a gland.

It is the object of my invention to provide means in connection with the head for a pump to mount the same direct on the casing of an electric motor, and provide for a detachable coupling with the motor shaft arranged to take care of both the torque load and thrust load in both directions. It is a further object to provide an adjustable packing gland between the portion of the pump head mounted on the motor casing and the pump head, thus packing the driving connection from the motor drive into the pump head, and it is a further object to utilize this gland in connection with the detachable connection between the pump drive shaft and the motor shaft.

The particular type of pump which is to be driven by the close coupling of my invention is not important to the novel features thereof, and I have shown in the drawings only an indication of the pump chamber which is to constitute one part of whatever pump is selected, and will be subject to plus or minus pump pressure. Among other things my device will operate with a pump which can be reversed in operation to so operate at sometimes with a thrust on the drive shaft at 180 degrees to the thrust at other times. The coupling is therefore devised, as noted above to take end thrusts in opposite directions.

I have illustrated in the drawings a preferred form of the invention, and it is not intended thereby to exclude modifications which will occur to those skilled in the art and are within the novelty of the device as set forth in the appended claims to which reference is hereby made.

Figure 3:
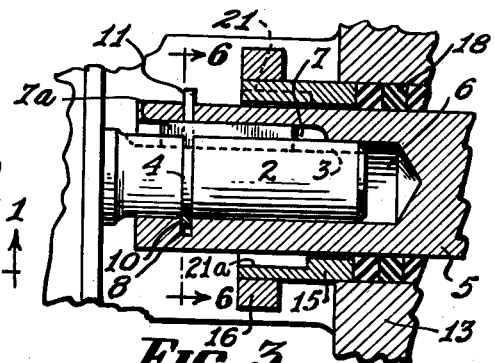
Figure 4:
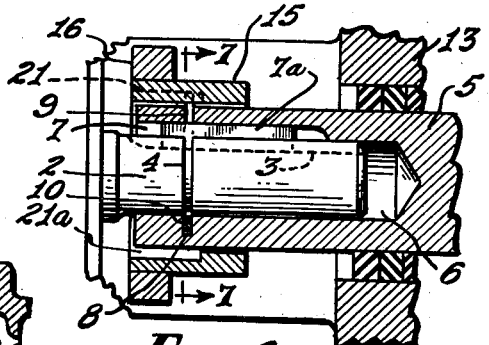
Figure 1:
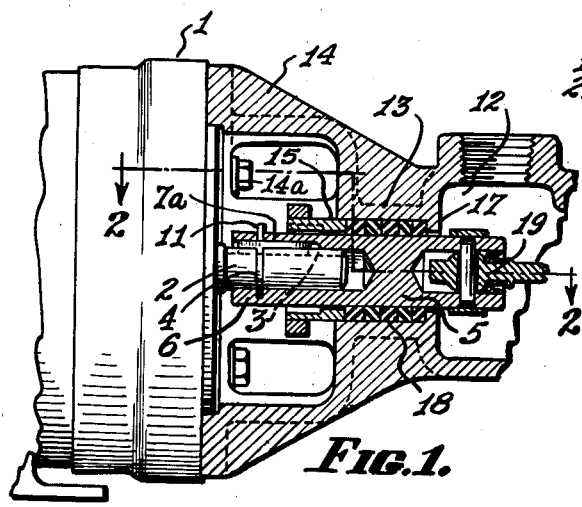
Figure 5:
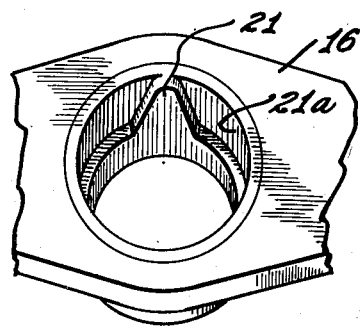
Figure 6:
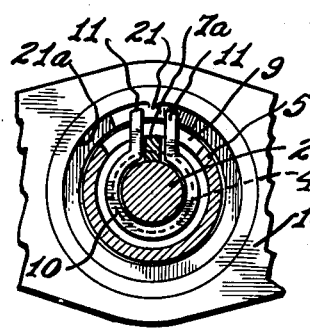
Figure 7:
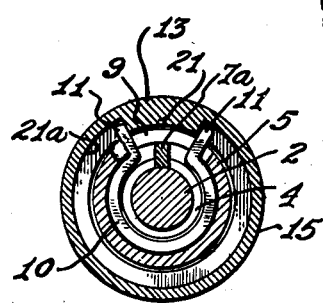

In the drawings Fig. 1 is a section taken centrally through the novel coupling. Fig. 2 is a section on the line 2—2 of Fig. 1, said Fig. 1 being on the line 1—1 of Fig. 2. Fig. 3 is a section on a larger scale showing the position of the gland and coupling when in use. Fig. 4 is a section similar to Fig. 3 but showing the use of the gland itself to detach the lengthwise connector. Fig. 5 is a detail perspective on a still larger scale showing the spreading grooves in the end of the gland. Fig. 6 is a section on the line 6—6 of Fig. 3 and Fig. 7 is a section on the line 7—7 of Fig. 4.

The motor casing is indicated generally at 1 and the motor shaft at 2. The shaft has a keyway therein at 3 for a driving key and an annular recess 4 for the thrust ring to be described. The pump driver is a stub shaft 5, which has a recess 6 therein, into which the shaft 2 is to be thrust. The recess 6 has a keyway 7 therein to engage the driving key 7a, and an internal annular groove 8 therein for the thrust ring. A slot 9 through the hollow portion of this stub shaft opens into the groove 8.

To join the two shafts for endwise connection and take thrust at 180 degrees thereon, there is employed a thrust ring already referred to. This ring is shown at 10. Its ends 11 are turned outwardly somewhat and the ring is made of resilient metal, so that the ring tends to contract so that the ends approach each other. The ring is placed within the groove 8 in the recess of the driving stub shaft, with its ends projecting through the slot 9 thereof. The ends 11 may hug the key 7a and be spaced thereby, or the ring constructed so that the ends 11 do not meet. When the motor shaft is thrust into the recess its end will spread the ring permitting the said motor shaft to be thrust well into the recess in the driving stub shaft, whereupon the annular groove in the motor shaft will come opposite the ring and it will snap into the said groove, not however entirely leaving the internal groove 8 in the said socket, otherwise to spread the ring in order to telescope the shaft, the sliding gland may be used as noted below. This will connect the motor shaft and the driving shaft endwise since the ring will engage in two concentric grooves. It makes no difference in which direction thrust is applied to the driving shaft, so far as this connection is concerned.

The pump casing 12 is preferably formed integrally (although there may be several pieces bolted tightly together in this portion of the device) so as to have a sleeve portion 13 acting as a stuffing box, and a casing 14 which is to be secured to the motor as by screws 14a. The driving stub shaft is mounted within the sleeve portion of this casing.

The packing gland which is mounted about the stub shaft has a cylindrical body 15, and a mounting flange 16. There is a shoulder 17 at the inner end of the sleeve portion of the casing, so that when the gland is located with its cylindrical portion within the sleeve portion of the casing it will press the packing 18 against the shoulder 17 thus sealing the stub shaft from the motor and from the pump casing. Thus, the pump head casing portion may be under plus or minus pressure as the case may be. I have illustrated a flexible joint connection 19 on the inner end of the driving shaft 5, but the connection with the pump at this point will be to suit the driving problem for the impeller member.

The flanged portion 16 of the gland is held in adjusted position by means of the screws 20, so as to adjust the compacting of the packing material.

As so far described, it would be impractical to remove the pump casing from the motor once the parts were assembled together. To provide for such disassembly, the inner end of the gland cylinder is provided with an integral key 21, the sides of which are divergent, and the cylinder is cut out as at 21a. The machined portion of the inner wall of the cylinder is confined to the key and those portions beyond the shoulder left by the cut away portion 21a. This construction leaves the tapered key 21 exposed to act as a spreader for the projecting ends of the thrust ring. By pushing in on the gland, or if the screws are made long enough simply by unscrewing these screws, the inner end of the gland may be slid over the projecting ends of the thrust ring. These ends enter the cut out portion 21a of the gland and upon further inward movement, the ends will be spread by the key 21. This will cause the thrust ring to expand sufficiently to release the motor shaft, and the entire casing with the head can be removed from the motor. Since the head secured on the motor will be of a spider formation, the projecting ends of the thrust ring are observable and can be readily oriented so as to permit this engagement and forcing apart by sliding in the gland.

Having thus described an example of my invention which illustrates the novel features thereof, I set forth below that which I claim as novel therein.

I claim:

1. A coupling between a drive shaft and a driven shaft, comprising a casing having a passage therein for one of said shafts, said drive shaft and driven shaft having telescoping connection between them beyond said passage, means for transmitting torque only between said shafts at said connection, a deformable thrust element, for transmitting thrust only, in engagement with both of said shafts in said connection when in normal undeformed position, said thrust element having means projecting from said telescoping connection, whereby said projecting means may be engaged from the outside to temporarily deform said thrust element to a position in which it is in engagement with only one of said shafts to effect release of said shafts, one from the other.

2. A coupling according to claim 1 wherein said telescoping shafts are provided respectively with an external annular groove and an internal annular groove, the outer one of said shafts being slotted to communicate with said internal annular groove, said thrust element comprising a deformable ring-like element normally in engagement both with the internal and external annular grooves and having its ends extending out through said slot.

3. A coupling according to claim 2 in which said thrust member is deformable by spreading apart of said extending ends, whereby said thrust member is disengaged from the external annular groove in the inner of said telescoping shafts.

4. A coupling according to claim 3 wherein said deformable ring-like thrust element has a free inside diameter appreciably less than the outside diameter of the inner of said shafts while the free outside diameter of said ring-like member is appreciably greater than the inside diameter of the outer of said shafts and appreciably less than the diameter of said internal annular groove.

5. A coupling between a drive shaft and a driven shaft, comprising a casing having a passage therein for one of said shafts with packing space thereabout, said drive shaft and driven shaft having telescoping engagement between them beyond said passage, means for transmitting torque between said shafts at said engagement, said shafts in said telescoping engagement having respectively an internal annular groove and an external annular groove, a split ring thrust element having engagement with both of said grooves, the outer of said telescoping shafts being slotted to communicate with said internal annular groove, said split ring having its ends turned outwardly to extend through said slot, said internal annular groove being of sufficient depth that when said projecting ends are spread apart said split ring is disengaged from said external annular groove so as to release said shafts one from the other.

6. A coupling according to claim 5 in which a gland is mounted over the outer one of said telescoping shafts for compressing packing within said packing space and in which said gland is provided with means to spread apart the projecting ends of said split ring.

7. A coupling according to claim 6 in which the means for spreading the ends of said split ring comprise a V-shaped key on said gland whereby axial movement of said gland results in the release of said shafts one from the other.

FREDERICK CAMERON BYRAM.

REFERENCES CITED

The following references are of record in the file of this patent:

UNITED STATES PATENTS

| Number | Name | Date |
|---|---|---|
| 1,246,326 | Rusby | Nov. 13, 1917 |
| 1,611,160 | Chilton | Dec. 21, 1926 |
| 1,957,038 | Beidler | May 1, 1934 |
| 2,177,287 | Schellenger | Oct. 24, 1939 |
| 2,382,539 | Brady | Aug. 14, 1945 |

FOREIGN PATENTS

| Number | Country | Date |
|---|---|---|
| 89,857 | Switzerland | of 1921 |